July 16, 1940.  S. FEINGOLD  2,208,125

APPARATUS FOR INTERMITTENTLY OPERATING GASEOUS ELECTRIC DEVICES

Filed June 14, 1939

INVENTOR
SAMUEL FEINGOLD
BY
Hyman Jackman
ATTORNEY

Patented July 16, 1940

2,208,125

UNITED STATES PATENT OFFICE 2,208,125

APPARATUS FOR INTERMITTENTLY OPERATING GASEOUS ELECTRIC DEVICES

Samuel Feingold, Brooklyn, N. Y.

Application June 14, 1939, Serial No. 279,113

7 Claims. (Cl. 175—373)

This invention relates to improvements in apparatus for intermittently operating electrical devices; and more particularly pertains to the intermittent operation of vapor electric devices requiring a relatively high voltage.

In marking on roads the positions of dangerous curves, cross-roads, and the like, it is the practice to employ intermittently flashing signs, popularly called beacons. It has been found that luminous tubes filled with neon gas are highly satisfactory. However, the use of such tubes requires a relatively high voltage, in the neighborhood of 2500 volts; and inasmuch as the beacons are positioned at points along the road remote from power lines and other sources of electricity, it has been necessary to operate the luminous tubes by means of storage batteries or dry cells. Heretofore, the high voltage has been obtained by mechanically breaking the circuit through a coil, but the operation of the mechanical means places a heavy load on the battery, and also, when mechanical means are employed there is always a delayed break of the circuit through the coil, all of which cause rapid deterioration of the battery, necessitating replacement at frequent intervals, with always the possibility of the battery suddenly failing before the necessary replacement can be made to continue the proper operation of the beacon.

In this disclosure the term relay is intended to refer to any electro-magnetic device having one or more coils and one or more armatures adapted to be attracted when the coils are excited.

In accordance with my invention, the break of the circuit through the primary of a transformer is caused by the excitation of a relay, which is in parallel with a condenser, the latter governing the time of operation of the relay. No mechanical means are required to make and break a circuit such as heretofore used on beacon lights, and the battery is employed only momentarily for each flash.

It is therefore an object of the invention to provide an apparatus for intermittently operating electrical devices requiring relatively high voltage derived from dry cells or storage batteries, which apparatus eliminates the use of mechanical make and break devices, such as above mentioned.

A further object is the provision of an apparatus for intermittently operating electrical devices, in which the interval between each operation can be controlled and determined by adjusting a non-inductive resistance or the capacity of a condenser.

These and other objects are attained by the novel construction, combination and arrangement of parts hereinafter described and shown in the accompanying drawing, constituting a material part of this disclosure, and in which.

Figure 1:
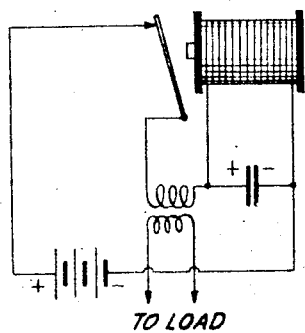
Fig. 1 is a wiring diagram of an apparatus embodying my invention, as used for operating an electrical device requiring a relatively high voltage.

If a resistance in series with a condenser is connected across a source of D. C. potential, the condenser will charge up through the resistance. The phenomenon is not accomplished suddenly, rather, certain definite relations are established first. The instant potential is applied to a resistor and condenser in series combination, the charge on the condenser being zero, the counter electromotive force is also zero, and the full potential is therefore placed across the resistance resulting in the maximum current flowing into the condenser, governed only by the ohmic value of the resistance. An instant later a charge due to this current has accumulated on the condenser, resulting in an appreciable counter electromotive force and hence a diminishing of the current flowing into the condenser, a short while later the charge has grown greater and the current has decreased some more. This goes on until the charge has reached the value of the potential producing it, the current at that point being zero. The rate of charge increases logarithmically from zero to maximum potential while the rate of current decrease, decreases logarithmically from maximum current to zero.

The rate of increase of charge and therefore the rate of decrease in current is determined by RC the time constant of the circuit, where R is the resistance of the circuit including the resistance of the condenser and C the capacity in farads. This is equal to the time required for the charge to reach .632 of its final or maximum value. This time is expressed in seconds. From the foregoing it can be seen that for any given capacity, all that is necessary to delay or increase the charge on the condenser is to vary the resistance of the circuit R. Also for any fixed value of R a different time constant will result if to it are connected capacities of varying values.

If, in a resistor condenser series combination, a resistance were shunted across or placed in parallel with the condenser, the charge on the condenser would never be higher than the voltage drop across the resistor, and also should the exciting source of potential be removed, the condenser will discharge through the parallel resistance. It is therefore possible to charge the condenser at a certain rate depending upon the value of the series resistance, and discharge it at another rate depending upon the value of the shunt resistance. The time constant holds good for either a charge or discharge condition and in the above case, two different time constants would be obtained. It is clearly seen from the above that since the condenser will not reach a higher potential than the potential across the shunted resistance, the resistance therefore will have to be as high as possible in comparison with the series resistance. If several resistances are shunted across the condenser it will charge up to the value of the potential across the equivalent resistance and the time constant for the discharge will be the product of the capacity and the value of the equivalent resistance.

In connection with the development of means to create electric impulses, all of the foregoing facts are used, also means which will prevent the condenser from discharging through nothing but the relay coil. Such means may be contacts which open at the point of discharge and rectifiers which prevent current from flowing in the reverse directions. These will be described later.

In Fig. 1 is shown a relay with a condenser shunted across it. This combination is connected to a source of D. C. minus potential on one side and to an impulse transformer a set of break contacts and a source of plus potential on the other side. From the theory already described, the counter electromotive force of the condenser being zero when the potential is first applied, the current will flow through the transformer and be limited only by its resistance. This will full excite the transformer, and begin to charge the condenser. Before the excitation has been materially diminished due to the increasing charge on the condenser, the relay being of the quick-acting type has operated, breaking the circuit, collapsing the flux of the transformer and flashing the neon tube. The condenser now begins to discharge through the relay, which will remain operated until the potential of the condenser has fallen to the non-operative point of the relay where it will release its armature and the action will start all over again. The speed of the generated impulses is governed by the resistance of the relay and the capacity of the condenser. The holding of the armature to the pole piece while the relay is being operated due to the condenser discharge is called the relay.

Figure 2:
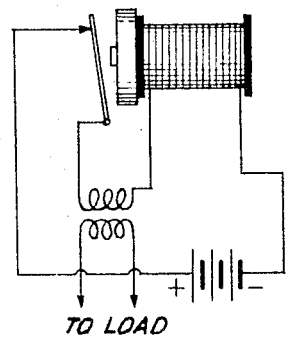
Figs. 2 to 4 are wiring diagrams of a modified form of the invention.

In Fig. 2 is shown a relay with a copper slug on the armature end. Either a slug or a sleeve around the iron core will have the same effect, namely to momentarily retard the attraction of the armature when voltage is applied to the relay, and after attraction to hold the armature attracted for a short period after the exciting current has been removed. Such a relay wired up as a buzzer with a transformer in series as shown will generate a continuous series of pulses or flashes.

Figure 3:
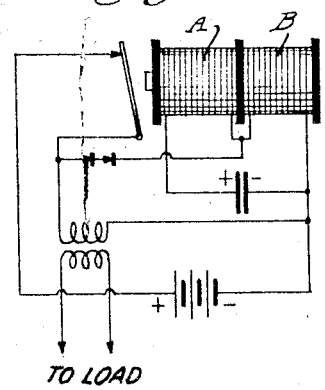

Fig. 3 shows a double wound relay wired up as a Gulstad relay, which is a relay described on pages 287 to 290 of "Printing telegraph systems and mechanisms" by H. H. Harrison, published 1923 by Langmans, Green & Co., New York. The armature will remain unattracted so long as the condenser is being charged, since the current flowing in the two coils simultaneously produce fluxes which are in opposition. When the condenser is charged the effect of coil A becomes zero. The current then flowing in coil B attracts the armature. When the armature leaves the contact, the condenser discharges through coils A and B in series and keeps the armature attracted. The rectifier is inserted to prevent the condenser from discharging through the transformer.

Figure 4:
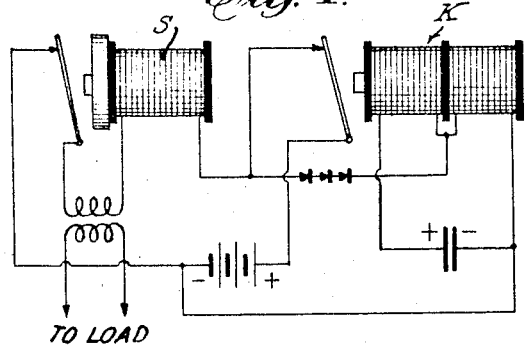

Fig. 4 shows a combination of Figs. 2 and 3 to produce a series of short pulses followed by a long delay. Relay K acts as a control relay to determine for what period of time, pulsing relay S should generate impulses. The pulses are generated while the control relay armature is unattracted. When the armature leaves the contact, the pulsing ceases since positive potential is removed and stays removed until the condenser is fully discharged and the armature falls back. To prevent the condenser from discharging through the pulsing relay the rectifier is used.

While the apparatus has been described as being applied to the operation of a neon tube or similar vapor electric device, it is obvious that it can be used for the intermittent operation of any electrical device requiring a relatively high transformed voltage obtained from dry cells or the like.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described my invention, what I claim as new and desire to secure by Letters Patent, is:

1. In an apparatus for the intermittent operation of electrical load devices, an electromagnetic device having a pair of coils in series, a condenser in parallel with said coils, an armature of the electromagnetic device adapted to be connected to the positive terminal of a battery when the electromagnetic device is unexcited, a rectifier connected to the junction of said coils and to said armature, a transformer having its primary coil connected to the armature and to the negative terminal of the battery, said condenser being connected to said negative terminal also, and an electrical load device connected to the terminals of the secondary of the transformer.

2. In an apparatus for the intermittent operation of electrical load devices, a first electromagnetic device having a pair of coils in series, a condenser in parallel with said coils, a rectifier connected to the junction of said coils, an armature of the first electromagnetic device connected to the positive terminal of a battery, said armature of the first electromagnetic device being adapted to be connected to said rectifier when the first electromagnetic device is unexcited, a second electromagnetic device having its coil in series with the primary of a transformer, the coil of the second electromagnetic device being connected to said rectifier, an armature for the second electromagnetic device connected to the negative terminal of the battery when the second electromagnetic device is unexcited, said second electromagnetic device having a core provided with a band of non-magnetic metal encircling the end thereof adjacent the armature of the second electromagnetic device, said condenser being connected to the negative terminal of the battery, and an electrical load device connected to the terminals of the secondary of the transformer.

3. In an apparatus for the intermittent operation of electrical load devices, a first electromagnetic device having a pair of coils in series, a condenser in parallel with said coils, a rectifier connected to the junction of said coils, an armature of the first electromagnetic device connected to the positive terminal of a battery, said armature of the first electromagnetic device being adapted to be connected to said rectifier when the first electromagnetic device is unexcited, a second electromagnetic device having its coil in series with the primary of a transformer, the coil of the second electromagnetic device being connected to said rectifier, an armature for the second electromagnetic device connected to the negative terminal of the battery when the second electromagnetic device is unexcited, said condenser being connected to the negative terminal of the battery, and an electrical load device connected to the terminals of the secondary of the transformer.

4. In an apparatus for the intermittent operation of electrical load devices, an electromagnetic device having a pair of coils in series, a condenser in parallel with said coils, an armature of the electromagnetic device adapted to be connected to the positive terminal of a battery when the electromagnetic device is unexcited, a rectifier connected to the junction of said coils, and to said armature, said condenser being connected to the negative terminal of the battery, and an electrical load device connected to the armature, and to said negative terminal.

5. In an apparatus for intermittent operation of electrical load devices, a first electromagnetic device having a pair of coils in series, a condenser in parallel with said coils, a rectifier connected to the junction of said coils, an armature of the first electromagnetic device connected to the positive terminal of a battery, said armature of the first electromagnetic device being adapted to be connected to said rectifier when the first electromagnetic device is unexcited, a second electromagnetic device connected to said rectifier, an armature of the second electromagnetic device connected to the negative terminal of the battery when the second electromagnetic device is unexcited, said second electromagnetic device having an electrical inductive retarding means adjacent the armature of the second electromagnetic device, said condenser being connected to the negative terminal of the battery, and an electrical load device connected in series with the second electromagnetic device.

6. In an apparatus for intermittent operation of electrical load devices, a first electromagnetic device having a pair of coils in series, a condenser in parallel with said coils, a rectifier connected to the junction of said coils, an armature of the first electromagnetic device connected to the positive terminal of a battery, said armature of the first electromagnetic device being adapted to be connected to said rectifier when the first electromagnetic device is unexcited, a second electromagnetic device connected to said rectifier, an armature of the second electromagnetic device connected to the negative terminal of the battery when the second electromagnetic device is unexcited, said second electromagnetic device having an electrical retarding means adjacent the armature of the second electromagnetic device, said condenser being connected to the negative terminal of the battery, and an electrical load device connected in series with the second electromagnetic device.

7. In an apparatus for intermittent operation of electrical load devices, a first electromagnetic device having a pair of coils in series, a condenser in parallel with said coils, a rectifier connected to the junction of said coils, an armature of the first electromagnetic device connected to the positive terminal of a battery, said armature of the first electromagnetic device being adapted to be connected to said rectifier when the first electromagnetic device is unexcited, a second electromagnetic device connected to said rectifier, an armature of the second electromagnetic device connected to the negative terminal of the battery when the second electromagnetic device is unexcited, said second electromagnetic device having an electrical retarding means, said condenser being connected to the negative terminal of the battery, and an electrical load device connected in series with the second electromagnetic device.

SAMUEL FEINGOLD.